US010924351B2

(12) United States Patent
Chou et al.

(10) Patent No.: US 10,924,351 B2
(45) Date of Patent: *Feb. 16, 2021

(54) NETWORK FUNCTIONS VIRTUALIZATION

(71) Applicant: Apple Inc., Cupertino, CA (US)

(72) Inventors: Joey Chou, Scottsdale, AZ (US); Muthaiah Venkatachalam, Beaverton, OR (US); Meghashree Dattatri Kedalagudde, Portland, OR (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,231

(22) Filed: May 9, 2019

(65) Prior Publication Data
US 2019/0334777 A1 Oct. 31, 2019

Related U.S. Application Data

(63) Continuation of application No. 15/510,998, filed as application No. PCT/US2015/038675 on Jun. 30, 2015.
(Continued)

(51) Int. Cl.
*H04L 12/24* (2006.01)
*G06F 9/455* (2018.01)
(Continued)

(52) U.S. Cl.
CPC ...... *H04L 41/0896* (2013.01); *G06F 9/45558* (2013.01); *H04L 41/0823* (2013.01);
(Continued)

(58) Field of Classification Search
CPC ............. H04L 41/0896; H04L 41/0823; G06F 9/45558; G06F 2009/45595; H04W 24/02; H04W 28/08
See application file for complete search history.

(56) References Cited

U.S. PATENT DOCUMENTS 5,844,886 A 12/1998 Szentesi
10,491,594 B2* 11/2019 Yan ..................... H04L 63/0428
(Continued)

FOREIGN PATENT DOCUMENTS

| CN | 104050045 A | 9/2014 | |
|---|---|---|---|
| WO | WO 2014110453 A1 | 7/2014 | |
| WO | WO-2014110453 A1 * | 7/2014 | ............... G06F 9/50 |

OTHER PUBLICATIONS

Intel; "pCR MME VNF Instantiation and Termination for Mixed Network;" 3GPP TSG S5-144250; (Aug. 18-22, 2014); 5 pages; SA WG5 (Telecom Management) Meeting #96, Sophia Antipolis, France; (Agenda 6.9.4—Study on Network Management of Virtualized Networks).

(Continued)

*Primary Examiner* — Javier O Guzman

(57) ABSTRACT

Technology for a virtualized network function manager (VNFM) in a mixed wireless network operable to facilitate instantiation of a virtualized network function (VNF) instance is disclosed. The VNFM can receive a request to instantiate a new VNF instance from a network manager (NM) via a network function virtualization (NFV) orchestrator (NFVO), the request including VNF instantiation information. The VNFM can send a request to a virtualized infrastructure manager (VIM) for allocating virtual resources for the new VNF instance based on the VNF instantiation information. The VNFM can receive an acknowledgement from the VIM after successful allocation of the virtualized resources for the new VNF instance. The VNFM can instantiate the new VNF instance and send an acknowledgement of the new VNF instance to the NFVO, wherein the new VNF instance is operable to ease congestion at an overloaded non-virtualized network element in the mixed wireless network.

18 Claims, 14 Drawing Sheets

Related U.S. Application Data

(60) Provisional application No. 62/059,022, filed on Oct. 2, 2014, provisional application No. 62/055,527, filed on Sep. 25, 2014.

(51) Int. Cl.
*H04W 24/02* (2009.01)
*H04W 28/08* (2009.01)

(52) U.S. Cl.
CPC ... *H04W 24/02* (2013.01); *G06F 2009/45595* (2013.01); *H04W 28/08* (2013.01)

(56) References Cited

U.S. PATENT DOCUMENTS

| | | | |
|---|---|---|---|
| 2014/0201374 A1 | 7/2014 | Ashwood-Smith et al. | |
| 2014/0207918 A1* | 7/2014 | Kowalski | G06F 11/0709 709/220 |
| 2014/0317261 A1* | 10/2014 | Shatzkamer | G06F 9/455 709/223 |
| 2015/0082308 A1* | 3/2015 | Kiess | G06F 9/5072 718/1 |
| 2015/0358248 A1* | 12/2015 | Saha | H04L 43/0817 709/226 |
| 2016/0057075 A1* | 2/2016 | Parikh | H04L 47/762 709/226 |
| 2016/0328259 A1* | 11/2016 | Xia | H04L 41/0813 |
| 2017/0012898 A1 | 1/2017 | Zhu et al. | |
| 2017/0012968 A1* | 1/2017 | Feng | H04L 12/6418 |
| 2017/0063678 A1 | 3/2017 | Rasanen et al. | |
| 2017/0156088 A1 | 6/2017 | Fujinami | |
| 2017/0208147 A1* | 7/2017 | I'Anson | H04L 41/0896 |
| 2017/0324612 A1* | 11/2017 | Perez | H04L 41/0806 |

OTHER PUBLICATIONS

ISR for PCT/US2015/038675 dated Sep. 10, 2015.
Network Functions Virualisation (NFV); Use Cases; ETSI GS NFV 001 V1.1.1 (Oct. 2013); Sophia Antipolis France.
Network Functions Virtualisation (NFV); Management and Orchestration; ETSI GS NFV-MAN 001 V0.6.3 (Sep. 2014); Sophia Antipolis France.
ETSI GS NFV 002 , "Network Functions Virtualisation (NFV); Architectural Framework", V1.2.1, Dec. 2014, 21 pages.
U.S. Appl. No. 15/510,998 , Final Office Action, dated Aug. 3, 2020, 17 pages.
China Mobile, Huawei, Nokia Networks, "The Proposal of Management Scenarios and Use Cases of TR 32.842", S5-144495 (Revision of S5-144220) 3GPP TSG SA WG5 (Telecom Management) Meeting #96, Sophia Antipolis, France, Agenda Item 6.9.4, Aug. 18-22, 2014, 3 pages.

* cited by examiner

| Stage | Description |
|---|---|
| Goal (*) | The goal is to show how the instantiation operations of the NFV lifecycle management can be used to instantiate a VNF in the mixed networks, when the non-virtualized NE is overloaded. |
| Assumptions | • The trigger point of VNF instantiation is in NM in order to minimize the impacts to the existing 3GPP management framework.<br>• There is no co-located VNF instance running. |
| Pre-conditions | • NFV management and orchestration operation is active.<br>• 3GPP management operation is active. |
| Begins when | NM detects that the NE is overloaded from monitoring the PM data received from EM, and determines to trigger VNF instantiation. |
| Step 1 (*) | NM sends a request to NFVO to instantiate a new VNF to compensate the overloaded NE. |
| Step 2 (*) | NFVO validates the request received from NM, and sends a request with VNF instantiation information to VNFM to instantiate the VNF. |
| Step 3 (*) | VNFM requests granting from the NFVO for adding a VM based on the specifications listed in the VNFD (CPU, Memory, IP, etc.). |
| Step 4 (*) | NFVO executes any necessary checking and processing, and then grants the operation of the VNF instantiation to VNFM. |
| Step 5 (*) | VNFM sends the request to VIM to add a VM, as instructed by the NFVO, |
| Step 6 (*) | VIM creates and starts the VM, then acknowledges successful operation to the VNFM. |
| Step 7 (*) | 1. VNFM instantiates the VNF, and configures it with VNF specific lifecycle parameters.<br>2. VNFM notifies NFV EM of the new VNF.<br>   a. NFV EM then configures the VNF with information required for VNF operation.<br>3. VNFM acknowledges the completion of VNF instantiation to NFVO. |
| Step 8 (*) | NFVO acknowledges the completion of VNF instantiation to NM and NFV NM. |
| Step 9 (*) | NM configures the EM to indicate that the new VNF is available for offloading. |
| Step 10 (*) | The VNF instance starts compensating the overloaded NE. For example, if the NE is MME, then the non-virtualized MME may start offloading UEs to the MME VNF instance. |
| Ends when (*) | The newly instantiated VNF instance is up and running. |

FIG. 2

| Stage | Description |
|---|---|
| Goal (*) | The goal is to show how the termination operations of the NFV lifecycle management can be used to terminate the VNF instance in the mixed networks, when the non-virtualized NE is wasting some unnecessary capacity. |
| Assumptions | • The trigger point of VNF termination is in NM in order to minimize the impacts to the existing 3GPP management framework.<br>• There is a co-located VNF instance running. |
| Pre-conditions | • NFV management and orchestration operation is active.<br>• 3GPP management operation is active. |
| Begins when | NM detects that the NE is was wasting some unnecessary capacity from monitoring the PM data received from EM, and determines to trigger VNF termination. |
| Step 1 (*) | NM sends a request to NFVO to terminate a VNF instance. |
| Step 2 (*) | 1. NFVO validates the request received from NM.<br>2. NFVO validates the VNF load.<br>3. NFVO sends a request to VNFM to terminate the VNF if NFVO determines that the VNF load can be carried by the non-virtualized NE; otherwise, the termination request is rejected. |
| Step 3 (*) | VNFM initiates VNF termination. To gracefully shutdown a VNF, it may be necessary for the VNF to coordinate with other 3GPP nodes. For example, the MME VNF needs to offload UEs to the non-virtualized MME NE prior to the MME VNF termination. |
| Step 4 (*) | VNFM sends an acknowledgement to NFVO after successfully terminating the VNF instance. |
| Step 5 (*) | NFVO requests VIM to delete the resources (e.g. compute, storage and network) used by the various VDUs of the VNF instance. |
| Step 6 (*) | VIM deletes the connectivity (i.e. networking), compute (VMs) and storage resources of the various VDUs of the VNF instance, and sends an acknowledgement of completion of resource release back to NFVO. |
| Step 7 (*) | NFVO acknowledges the completion of VNF instance termination to NM and NFV NM. |
| Step 8 (*) | NM configures the EM to indicate that the VNF instance has been terminated. |
| Ends when (*) | The VNF instance has been terminated. |

FIG. 3

| Stage | Description |
|---|---|
| Goal (*) | The goal is to show how VNF expansion operation can add capacity to a VNF, when NFV EM detects that the VNF instance is overloaded. |
| Assumptions | • The trigger point of VNF expansion is in NFV EM. |
| Pre-conditions | • NFV management and orchestration operation is active.<br>• 3GPP management operation is active. |
| Begins when | NFV EM detects that the VNF is overloaded from monitoring the PM data received from VNF, and determines to trigger the VNF expansion. |
| Step 1 (*) | NFV EM sends the expansion request to VNFM. |
| Step 2 (*) | VNFM requests granting from the NFVO for VNF expansion based on the specifications listed in the VNFD. |
| Step 3 (*) | NFVO checks the request against its capacity database for free resource availability, and then grants the VNF expansion to VNFM. |
| Step 4 (*) | VNFM sends the request to VIM to expand an existing VNF, as instructed by the NFVO, |
| Step 5 (*) | VIM instantiates and starts the VMs and the relevant networking resources, then acknowledges successful operation to VNFM. |
| Step 6 (*) | 1. VNFM configures VNF data specific for VNF expansion.<br>2. VNFM notifies the NFV EM that an existing VNF has been updated with additional capacity. |
| Ends when (*) | The VNF instance has been expanded. |

FIG. 4

| Stage | Description |
|---|---|
| Goal (*) | The goal is to show how VNF expansion operation can add capacity to a VNF, when VNFM detects that the VNF instance is overloaded. |
| Assumptions | • The trigger point of VNF expansion is in VNFM. |
| Pre-conditions | • NFV management and orchestration operation is active.<br>• 3GPP management operation is active. |
| Begins when | VNFM detects that the VNF is overloaded from monitoring the PM data received from VNF, and determines to trigger the VNF expansion. |
| Step 1 (*) | VNFM requests granting from the NFVO for VNF expansion based on the specifications listed in the VNFD. |
| Step 2 (*) | NFVO checks the request against its capacity database for free resource availability, and then grants the VNF expansion to VNFM. |
| Step 3 (*) | VNFM sends the resource request to VIM to expand an existing VNF, as instructed by the NFVO, |
| Step 4 (*) | VIM instantiates and starts the VMs and the relevant networking resources, then acknowledges successful operation to VNFM. |
| Step 5 (*) | 1. VNFM configures VNF data specific for VNF expansion.<br>2. VNFM notifies the NFV EM that an existing VNF has been updated with additional capacity. |
| Ends when (*) | The VNF instance has been expanded. |

FIG. 5

| Stage | Description |
|---|---|
| Goal (*) | The goal is to show how VNF expansion operation can add capacity to a VNF, when NFV NM detects that the VNF instance is overloaded. |
| Assumptions | • The trigger point of VNF expansion is in NFV NM. |
| Pre-conditions | • NFV management and orchestration operation is active.<br>• 3GPP management operation is active. |
| Begins when | NFV NM detects that the VNF is overloaded from monitoring the PM data received from EM, and determines to trigger the VNF expansion. |
| Step 1 (*) | NFV NM sends a request to NFVO for VNF expansion. |
| Step 2 (*) | NFVO executes any necessary checking and processing, and then requests VNFM to expand the capacity of an existing VNF. |
| Step 3 (*) | VNFM requests granting from the NFVO for VNF expansion based on the specifications listed in the VNFD. |
| Step 4 (*) | NFVO checks the request against its capacity database for free resource availability, and then grants the VNF expansion to VNFM. |
| Step 5 (*) | VNFM sends the request to VIM to expand an existing VNF, as instructed by the NFVO, |
| Step 6 (*) | VIM instantiates and starts the VMs and the relevant networking resources, then acknowledges successful operation to VNFM. |
| Step 7 (*) | 1. VNFM configures VNF data specific for VNF expansion.<br>2. VNFM notifies the NFV EM that an existing VNF has been updated with additional capacity.<br>3. VNFM acknowledges the completion of VNF expansion to NFVO. |
| Step 8 (*) | NFVO acknowledges the completion of VNF expansion to NFV NM. |
| Ends when (*) | The VNF instance has been expanded. |

FIG. 6

| Stage | Description |
|---|---|
| Goal (*) | The goal is to show how VNF contraction operation can reduce capacity of a VNF, when NFV EM detects that the VNF instance is wasting some unnecessary capacity. |
| Assumptions | • The trigger point of VNF contraction is in NFV EM. |
| Pre-conditions | • NFV management and orchestration operation is active.<br>• 3GPP management operation is active. |
| Begins when | NFV EM detects a capacity release opportunity from monitoring the PM data received from VNF, and determines to trigger the VNF contraction. |
| Step 1 (*) | NFV EM sends the contraction request to VNFM. |
| Step 2 (*) | VNFM requests granting from the NFVO for VNF contraction based on the specifications listed in the VNFD. |
| Step 3 (*) | NFVO checks the request against the configured policies, and then grants the VNF contraction to VNFM. |
| Step 4 (*) | 1. VNFM requests VNF to gracefully terminate a VNF component.<br>2. VNFM sends a request to VIM to release certain resources, as instructed by NFVO |
| Step 5 (*) | VIM releases resources and acknowledges to VNFM. |
| Step 6 (*) | 1. VNFM reports successful VNF contraction to NFVO.<br>2. VNFM acknowledges to the NFV EM that an existing VNF has been updated with requested capacity release. |
| Ends when (*) | The VNF instance has been contracted. |

FIG. 7

| Stage | Description |
|---|---|
| Goal (*) | The goal is to show how VNF contraction operation can reduce capacity of a VNF, when VNFM detects that the VNF instance is wasting some unnecessary capacity. |
| Assumptions | • The trigger point of VNF contraction is in VNFM. |
| Pre-conditions | • NFV management and orchestration operation is active.<br>• 3GPP management operation is active. |
| Begins when | VNFM detects a capacity release opportunity from monitoring the PM data received from VNF, and determines to trigger the VNF contraction. |
| Step 1 (*) | VNFM requests granting from the NFVO for VNF contraction based on the specifications listed in the VNFD. |
| Step 2 (*) | NFVO checks the request against the configured policies, and then grants the VNF contraction to VNFM. |
| Step 3 (*) | 1. VNFM requests VNF to gracefully terminate a VNF component.<br>2. VNFM sends a request to VIM to release certain resources, as instructed by NFVO |
| Step 4 (*) | VIM releases resources and acknowledges to VNFM. |
| Step 5 (*) | 1. VNFM reports successful VNF contraction to NFVO.<br>2. VNFM acknowledges to the NFV EM that an existing VNF has been updated with requested capacity release. |
| Ends when (*) | The VNF instance has been contracted. |

FIG. 8

| Stage | Description |
|---|---|
| Goal (*) | The goal is to show how VNF contraction operation can reduce capacity of a VNF, when NFV NM detects that the VNF instance is wasting some unnecessary capacity. |
| Assumptions | • The trigger point of VNF contraction is in NFV NM. |
| Pre-conditions | • NFV management and orchestration operation is active.<br>• 3GPP management operation is active. |
| Begins when | NFV NM detects a capacity release opportunity from monitoring the PM data received from EM, and determines to trigger the VNF contraction. |
| Step 1 (*) | NFV NM sends a request to NFVO for VNF contraction. |
| Step 2 (*) | NFVO executes any necessary checking and processing, and then requests VNFM to contract the capacity of an existing VNF. |
| Step 3 (*) | VNFM requests granting from the NFVO for VNF contraction based on the specifications listed in the VNFD. |
| Step 4 (*) | NFVO checks the request against the configured policies, and then grants the VNF contraction to VNFM. |
| Step 5 (*) | 1. VNFM requests VNF to gracefully terminate a VNF component.<br>2. VNFM sends a request to VIM to release certain resources, as instructed by NFVO |
| Step 6 (*) | VIM releases resources and acknowledges to VNFM. |
| Step 7 (*) | 1. VNFM reports successful VNF contraction to NFVO.<br>2. VNFM acknowledges to the NFV EM that an existing VNF has been updated with requested capacity release. |
| Step 8 (*) | NFVO acknowledges the completion of VNF extraction to NFV NM. |
| Ends when (*) | The VNF instance has been contracted. |

FIG. 9

NETWORK FUNCTIONS VIRTUALIZATION

RELATED APPLICATIONS

The present application is a continuation of U.S. patent application Ser. No. 15/510,998 filed Mar. 13, 2017 which is a 371 Nationalization of PCT Application No. PCT/US2015/038675 filed Jun. 30, 2015 which claims priority to U.S. Provisional Patent Application No. 62/059,022, filed Oct. 2, 2014 and U.S. Provisional Patent Application No. 62/055,527, filed Sep. 25, 2014, the entire specifications of which are hereby incorporated by reference in their entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division uplexing (FDD).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 2 illustrates a procedure for instantiating a virtualized network function (VNF) instance in a mixed wireless network in accordance with an example;

FIG. 3 illustrates a procedure for terminating a virtualized network function (VNF) instance in a mixed wireless network in accordance with an example;

FIG. 4 illustrates a procedure for expanding virtualized resources for a virtualized network function (VNF) instance in a mixed wireless network in accordance with an example;

FIG. 5 illustrates a procedure for expanding virtualized resources for a virtualized network function (VNF) instance in a mixed wireless network in accordance with an example;

FIG. 6 illustrates a procedure for expanding virtualized resources for a virtualized network function (VNF) instance in a mixed wireless network in accordance with an example;

FIG. 7 illustrates a procedure for contracting virtualized resources for a virtualized network function (VNF) instance in a mixed wireless network in accordance with an example;

FIG. 8 illustrates a procedure for contracting virtualized resources for a virtualized network function (VNF) instance in a mixed wireless network in accordance with an example;

FIG. 9 illustrates a procedure for contracting virtualized resources for a virtualized network function (VNF) instance in a mixed wireless network in accordance with an example;

Figure 1:
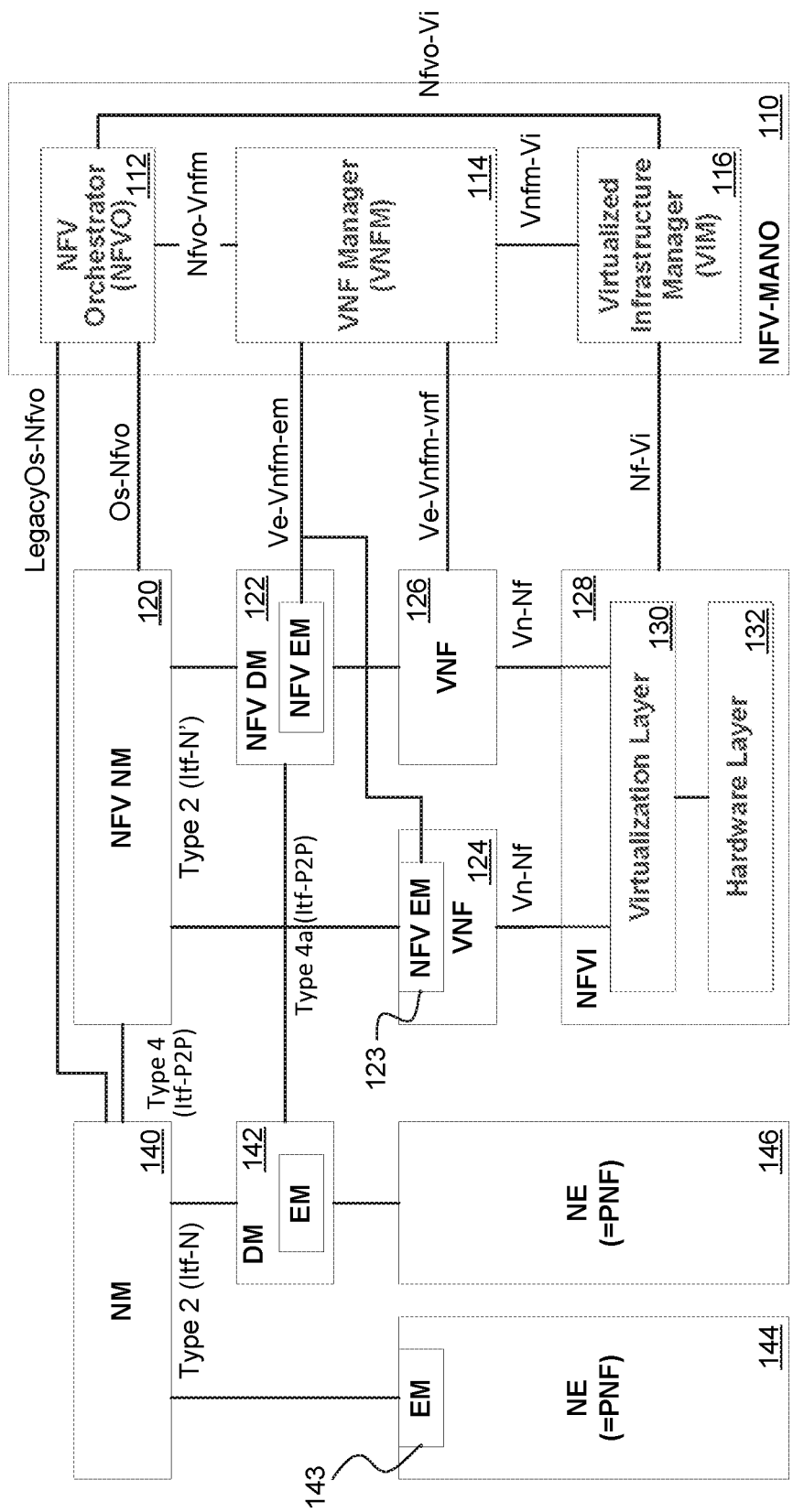
FIG. 1 illustrates a Third Generation Partnership Project (3GPP) Release 13 network functions virtualization (NFV) management architecture that includes a management architecture for managing non-virtualized and virtualized network elements, and a NFV management and network orchestration (MANO) architectural framework in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for instantiating virtualized network function (VNF) instances in a mixed wireless network. The VNF instances can be instantiated in order to run, for example, a virtualized evolved node B (eNB), a virtualized radio base station, a virtualized mobility management entity (MME), a virtualized serving gateway (SGW), a virtualized packet data network (PDN) gateway (PGW), etc. The VNF instances can be created based on network demand in real-time, without the need for installing new equipment. In one example, the VNF instances can be instantiated in the mixed wireless network using network functions virtualization (NFV). The mixed wireless network can be operable to support a Third Generation Partnership Project (3GPP) Release 13 NFV management architecture that includes a management architecture for managing non-virtualized and virtualized network elements, and a NFV management and network orchestration (MANO) architectural framework. In addition, the VNF instances can be terminated, and virtualized resources for the VNF instances can be expanded or contracted automatically and dynamically based on network demand (e.g., network traffic).

In traditional solutions, operator network architecture is typically integrated vertically over proprietary hardware platforms. Network operators can estimate future traffic demands based on the lifecycle process of network deployments, and then the network operators can follow up with network equipment procurements and deployments. In some cases, the network operators may realize that some expected demands do not materialize, thereby leaving relatively large blocks of capacity unused. At the same time, other demands may exceed the network operator's original estimation, thereby causing major degradation to user experiences. Therefore, the traditional network operator business model, which is based on vertically integrated hardware, has a number of issues, such as an increased, shorter hardware lifecycle, increasing complexity in integration, the inability to scale resources based on traffic demands, etc.

NFV (Network Functions Virtualization), formed in the European Telecommunications Standards Institute (ETSI) Industry Specification Group (ISG), is aimed to address various drawbacks faced by network operators. NFV can include evolving standard information technology (IT) virtualization technology to consolidate network equipment types (e.g., MMEs) onto industry standard high volume servers, switches and storage. NFV can involve implementing network functions (e.g., MME functionality) in software, which can run on a range of commercial off-the-shelf (COTS) server hardware. The virtualized network function software can then be moved to, or instantiated in, various locations in the network when needed without having to install new equipment. NFV is in contrast to legacy networks, in which network function (NF) implementations are tightly coupled with the infrastructure on which the network functions are run.

FIG. 1 illustrates an exemplary Third Generation Partnership Project (3GPP) Release 13 network functions virtualization (NFV) management architecture that includes management architecture for managing non-virtualized and virtualized network elements, and a NFV management and network orchestration (MANO) architectural framework. In other words, the 3GPP NFV management architecture can manage a mixed wireless network that includes both virtualized network elements (NEs) and non-virtualized network elements. The 3GPP NFV management architecture can be further explained in 3GPP Technical Report (TR) 32.842.

As shown in FIG. 1, the 3GPP NFV management architecture can include a non-virtualized portion, which corresponds to traditional 3GPP network elements. The 3GPP NFV management architecture can include a virtualized portion that is operable to perform NFV. In other words, non-virtualized network elements and virtualized network elements can be co-located in the mixed wireless network. The mixed wireless network can operate both physical network functions (PNFs) and virtualized network functions (VNFs). In addition, the 3GPP NFV management architecture can include an NFV-MANO element 110 that serves as an intermediary between the non-virtualized portion and the virtualized portion of the 3GPP NFV management architecture.

The non-virtualized portion of the 3GPP NFV management architecture can include a network manager (NM) 140, a domain manager (DM) 142, an element manager (EM) 143, and network elements (NEs) 144, 146. The NM 140 can perform a network manager role for a non-virtualized portion of the mixed wireless network. The DM 142 can perform a domain manager role for the non-virtualized portion of the mixed wireless network. The NM 140 and the DM 142 can be connected via a type 2 (Itf-N) interface. The EM 143 can perform an element manager role for the non-virtualized portion of the mixed wireless network. The EM 142 can be part of the DM 142, or alternatively, the EM 142 can be part of the NE 144. The NEs 144, 146 can be non-virtualized evolved node Bs (eNBs), non-virtualized radio base stations, non-virtualized baseband units (BBUs), non-virtualized mobility management entities (MMEs), non-virtualized serving gateways (SGWs), non-virtualized packet data network (PDN) gateways (PGWs), etc. The NEs 144, 146 can also be referred to as physical network functions (PNFs). The NM 140 and the EM 142 (that is part of the NE 144) can be connected via the type 2 (Itf-N) interface. Therefore, the NM 140 and the EM 142 can manage existing non-virtualized network elements.

The virtualized portion of the 3GPP NFV management architecture can include a NFV network manager (NFV NM) 120, a NFV domain manager (NFV DM) 122, a NFV element manager (NFV EM) 123, VNF instances 124, 126, and a NFV infrastructure (NFVI) 128, which can include a virtualization layer 130 and a hardware layer 132. The NFV NM 120 can perform a network manager role for a virtualized portion of the mixed wireless network. The NFV DM 122 can perform a domain manager role for the virtualized portion of the mixed wireless network. The NFV NM 120 and the NFV DM 122 can be connected via a type 2 (Itf-N') interface. The type 2 (Itf-N') interface can reuse existing protocols with possible adaptation to support virtualized networks (or mixed wireless networks). In addition, the NFV NM 120 can be connected to the NM 140 via a type 4

(Itf-P2P) interface, and the NFV DM 122 can be connected to the DM 142 via a type 4a (Itf-P2P) interface.

The NFV EM 123 can perform an element manager role for the virtualized portion of the mixed wireless network. The NFV EM 123 can be part of the NFV DM 122, or alternatively, the NFV EM 123 can be part of a VNF instance 124. The VNF instances 124,126 can be virtualized evolved node Bs (eNBs), virtualized radio base stations, virtualized baseband units (BBUs), virtualized mobility management entities (MMEs), virtualized serving gateways (SGWs), virtualized packet data network (PDN) gateways (PGWs), etc. In other words, the VNF instances 124, 126 can perform software implementations of the NEs 144, 146, wherein the VNF instances 124, 126 can be deployed on the NFVI 128. The NFV NM 120 and the NFV EM 123 (that is part of the VNF instance 124) can be connected via the type 2 (Itf-N') interface. Therefore, the NFV NM 120 and the NFV EM 123 can manage the VNF instances 124, 126.

The NFVI 128 can encompass the hardware components (e.g., compute, storage, and networking) and software components (e.g., hypervisors) that together provide the infrastructure resources for deployment of the VNF instances 124, 126. In one example, the NFVI 128 can include partially virtualized network functions (NFs), which are related to "white box" switches, hardware load balancers, digital subscriber line (DSL) access multiplexers (DSLAMs), a broadband remote access server (BRAS), Wi-Fi access points, etc., for which certain portions of the functionality are virtualized and within the scope of the NFV-MANO and other portions are non-virtualized. In one example, the NFVI 128 can be connected to the VNF instances 124, 126 via a Vn-Nf interface.

The NFV-MANO 110 can function to manage the NFVI 128 and orchestrate the allocation of resources for the VNF instances 124, 126. The NFV-MANO 110 can include a NFV orchestrator (NFVO) 112, a VNF manager (VNFM) 114, and a virtualized infrastructure manager (VIM) 116. The NFVO 112, the VNFM 114 and the VIM 116 can be functional entities included in the 3GPP NFV management architecture. The functionality of the NFV-MANO can be further described in European Telecommunications Standards Institute (ETSI) Group Specification (GS) NFV-MAN 001, "Network Function Virtualization (NFV) Management and Orchestration".

The NFVO 112 can perform the orchestration of NFVI resources, or network resources across multiple VIMs, as well as lifecycle management of network services. For example, the NFVO 112 can perform network service instantiation and network service instance lifecycle management, e.g., update, query, scaling, collecting performance measurement results, event collection, termination, etc. The NFVO 112 can perform management of the instantiation of the VNF instances 124, 126 in coordination with the VNFM 114. The NFVO 112 can perform validation and authorization of NFVI resource requests from the VNFM 114 (as the resource requests can impact network services), wherein the NFVO 112 can perform the validation and authorization of the resource requests based on predefined network policies. The NFVO 112 can perform management of the network service instances topology (e.g., create, update, query, or delete VNF forwarding graphs).

The VNFM 114 can perform lifecycle management for the VNF instances 124, 126. Each VNF instance can be associated with a particular VNFM. The VNFM 114 can be assigned the management of a single VNF instance, or the management of multiple VNF instances of the same type or of different types. The VNFM 114 can perform VNF instantiation (with or without feasibility checking). The VNFM 114 can perform a VNF instance software update or upgrade. The VNFM 114 can perform VNF instance modification. The VNFM 114 can perform VNF instance scaling out/in and up/down (e.g., the VNF instance can be expanded or contracted). The VNFM 114 can perform VNF instance-related collection of NFVI performance measurement results, as well as faults and event information. The VNFM 114 can perform VNF instance assisted or automated healing. The VNFM 114 can perform VNF instance termination. The VNFM 114 can manage the integrity of the VNF instance through its lifecycle.

In one example, the deployment and operational behavior of each VNF is captured in a template, which is referred to as a VNF descriptor (VNFD). The NFV-MANO 110 can use the VNFD to create instances of the VNF it represents, and to manage the lifecycle of those instances. The VNFD can have a one-to-one correspondence with a VNF Package, and the VNFD can fully describe the attributes and requirements for realizing such a VNF instance. NFVI resources can be assigned to the VNF instance based not only on the requirements captured in the VNFD (e.g., resource allocation criteria), but also on specific constraints and policies that have been pre-provisioned or are accompanying the request for instantiation. In some examples, these other constraints (e.g., operator policies, geo-location placement, affinity/anti-affinity rules, and local regulations) may override certain requirements included in the VNFD.

The VNFM 114 can have access to a repository of available VNF Packages, which are represented via their associated VNFDs. Different versions of a VNF Package may correspond to different implementations of the same function, different versions to run in different execution environments (e.g., on different hypervisors, dependent on NFVI resources availability information, etc.), or different release versions of the same software. The repository may be maintained by the NFVO 112 or another external entity in the 3GPP NFV management architecture.

The VIM 116 can perform the controlling and managing of the NFVI compute, storage, and network resources. The VIM 116 can be specialized in handling a certain type of NFVI resource (e.g., compute-only, storage-only, network-ing-only), or the VIM 116 can be capable of managing multiple types of NFVI resources (e.g., in NFVI-Nodes). The VIM 116 can orchestrate the allocation, upgrade, release and/or reclamation of NFVI resources (including the optimization of such resource usage). The VIM 116 can manage the association of the virtualized resources to the physical compute, storage, and networking resources. Therefore, the VIM 116 can maintain an inventory of the allocation of virtual resources to physical resources. The VIM 116 can support the management of VNF forwarding graphs (e.g., create, update, query, or delete VNF forwarding graphs). The VIM 116 can manage an inventory of NFVI hardware resources (e.g., compute, storage, and networking), software resources (e.g., hypervisors), and the discovery of the capabilities and features of such resources (e.g., with respect to usage optimization). The VIM 116 can manage the virtualized resource capacity (e.g., a density of virtualized resources to physical resources), and forward or report information related to the NFVI resource capacity and usage. In addition, the VIM 116 can manage software images (e.g., add, delete, update, query or copy software images) as requested by other entities in the NFV-MANO 110 (e.g., the NFVO 112), wherein the VIM 116 can maintain repositories of the software images in order to streamline the allocation of the virtualized computing resources.

In one example, the NFVO 112 can be connected to the NM 140 via a LegacyOS-Nfvo interface. The NFVO 112 can be connected to the NFV NM 120 via an Os-Nfvo interface. The NFVO 112 can be connected to the VNFM 114 via an Nfvo-Vnfm interface. In addition, the NFVO 112 can be connected to the VIM 116 via an Nfvo-Vi interface.

In one example, the VNFM 114 can be connected to the NFVO 112 via an Nfvo-Vnfm interface. The VNFM 114 can be connected to the NFV DM 122 via an Ve-Vnfm-em interface. The VNFM 114 can be connected to the VNF instances 124, 126 via an Ve-Vnfm-vnf interface. In addition, the VNFM 114 can be connected to the VIM 116 via an VNfm-Vi interface. In order to minimize the impact to the existing EM 143, there can be no direct interface between the VNFM 114 and the EM 143.

In one example, the VIM 116 can be connected to the VNFM 114 via an VNfm-Vi interface. The VIM 116 can be connected to the NFVO 112 via an Nfvo-Vi interface. In addition, the VIM 116 can be connected to the NFVI 128 via an Nf-Vi interface.

FIG. 2 illustrates an exemplary procedure for instantiating a virtualized network function (VNF) instance in a mixed wireless network. The mixed wireless network can include non-virtualized network elements that are co-located with virtualized network elements. Instantiation operations of the network virtualization function (NVF) lifecycle management can be used to instantiate a virtual network function (VNF) instance in the mixed wireless network when a non-virtualized network element is overloaded. The VNF instance that is instantiated can help offload some of the traffic on the non-virtualized network element. In other words, the VNF instance can function to ease the burden on the non-virtualized network element. In this configuration, the trigger point for the VNF instantiation can be at a network manager (NM) in order to minimize the impact to the existing 3GPP Release 8, 9, 10 or 11 management framework. The VNF instantiation can occur when there is no co-located VNF instance running. In addition, the VNF instantiation can occur when the network function virtualization (NFV) management and orchestration operation, as well as the 3GPP management operation, are both active.

The VNF instantiation procedure can begin when the NM detects that a non-virtualized network element (NE) is overloaded. The non-virtualized network element can include an evolved node B (eNB), a radio base station, a mobility management entity (MME), a serving gateway (SGW), a packet data network (PDN) gateway (PGW), etc. In one example, the non-virtualized network element can be overloaded when user traffic for the non-virtualized network element is above a defined level. The NM can detect that the NE is overloaded by monitoring performance (PM) data that is received from an element manager (EM), and the NM can determine to trigger VNF instantiation based on the NE being overloaded. In other words, the VNF instantiation can be triggered at the NM.

In action 1 of the VNF instantiation procedure, the NM can send a request to a NFV orchestrator (NFVO) to instantiate a new VNF instance to compensate for the overloaded NE. The NFVO can be included in a NFV management and network orchestration (NFV-MANO). The NFV-MANO can be a functional entity in the 3GPP NFV management architecture. The NM can send the request to the NFVO upon detecting that the NE is overloaded.

In action 2, the NFVO can receive the request for the new VNF instance from the NM. The NFVO can validate the request, and upon the NFVO being successfully validated, the NFVO can send the request to a VNF manager (VNFM) to instantiate the new VNF instance. The VNFM can also be included in the NFV-MANO. In addition, the request sent from the NFVO to the VNFM can include VNF instantiation information related to the new VNF instance.

In action 3, the VNFM can receive the request to instantiate the new VNF instance from the VNFO. The VNFM can request granting from the NFVO for allocating virtual resources, such as a virtual machine (VM), for the new VNF instance. The VNFM can perform the request based on specifications listed in a VNF descriptor (VNFD), wherein the specifications can be related to processing capability, memory, Internet Protocol (IP), etc.

In action 4, the NFVO can receive the request for the allocation of virtual resources from the VNFM. The NFVO can perform any necessary verification and/or processing of the requested grant received from the VNFM, and if permissible, the NFVO can grant the operation of the VNF instantiation to the VNFM. In other words, the NFVO can grant the allocation of resources for the new VNF instance to be instantiated.

In action 5, the VNFM can receive an indication of the grant from the NFVO. The VNFM can send a request to a virtualized infrastructure manager (VIM) to allocate the virtual resources (e.g., the virtual machine) for the new VNF instance, as instructed by the NFVO. The VIM can also be included in the NFV-MANO, along with the VNFM and the NFVO.

In action 6, the VIM can receive the request from the VNFM. The VIM can allocate the virtual resources (e.g., the VIM can create and start the VM), and then acknowledge successful allocation of the virtual resources to the VNFM.

In action 7, the VNFM can receive the acknowledgement from the VIM indicating that the virtual resources have been successfully allocated for the new VNF instance. The VNFM can instantiate the new VNF instance, and configure the new VNF instance with specific lifecycle parameters. The lifecycle parameters can be specific to VNF deployment after lifecycle instantiation, such as information related to the virtual machine (VM), memory, forward graph, etc. that are used to bootstrap VNF operation. In action 7, the VNFM can notify a NFV element manager (NFV EM) of the new VNF instance, so that the NFV EM can configure the VNF instance with information needed for VNF operation. For example, the NFV EM can configure VNF application specific parameters (e.g., parameters specific to a virtualized MME application). In addition, the VNFM can send an acknowledgement to the NFVO indicating completion of the VNF instantiation.

In action 8, the NFVO can receive the acknowledgement from the VNFM. The NFVO can send an acknowledgement to the NM and a NFV network manager (NFV NM) indicating completion of the VNF instantiation.

In action 9, the NM can receive the acknowledgement from the NFVO. The NM can configure an element manager (EM) to indicate that the new VNF instance is available for offloading.

In action 10, the new VNF instance can start compensating for the overloaded NE. The VNF instantiation procedure can be completed when the newly instantiated VNF instance is up and running.

As a non-limiting example, the NM can detect that a particular mobility management entity (MME) is overloaded, wherein the MME is a non-virtualized MME. The NM can trigger an instantiation of a new VNF instance to take some of the load off of the overloaded MME. In other words, the new VNF instance can perform MME functionality, thereby alleviating some of the burden on the MME. The VNF instantiation procedure as described above can be completed, and the new VNF instance can be instantiated. The non-virtualized MME that is overloaded can start offloading user equipments (UEs) to the new VNF instance with MME functionality (i.e., the MME VNF instance), thereby decreasing the load at the non-virtualized MME.

FIG. 3 illustrates an exemplary procedure for terminating a virtualized network function (VNF) instance in a mixed wireless network. The mixed wireless network can include non-virtualized network elements that are co-located with virtualized network elements. Termination operations of the network virtualization function (NVF) lifecycle management can be used to terminate a virtual network function (VNF) instance in the mixed wireless network when a non-virtualized network element is unnecessarily wasting capacity. In other words, network traffic may have decreased after a period of time, and the VNF instance that was previously instantiated may no longer be needed. In this configuration, the trigger point for the VNF termination can be at a network manager (NM) in order to minimize the impact to the existing 3GPP Release 8, 9, 10 or 11 management framework. The VNF termination can occur when there is no co-located VNF instance running. In addition, the VNF termination can occur when the network virtualization function (NVF) management and orchestration operation, as well as the 3GPP management operation, are both active.

The VNF termination procedure can begin when the NM detects that virtual resources and computing capacity are being unused and wasted at a non-virtualized network element (NE). In one example, the computing capacity at the non-virtualized network element can be wasted when user traffic for the non-virtualized network element is below a defined level. The NM can detect that the NE is unnecessarily wasting some computing capacity by monitoring performance (PM) data that is received from an element manager (EM), and the NM can determine to trigger VNF termination based on the NE being under-utilized. In other words, the VNF termination can be triggered at the NM.

In action 1 of the VNF termination procedure, the NM can send a request to a NFV orchestrator (NFVO) to terminate an existing VNF instance. The NFVO can be included in a NFV management and network orchestration (NFV-MANO), wherein the NFV-MANO can be a functional entity in the 3GPP NFV management architecture. The NM can send the request to the NFVO upon detecting that computing resources at the NE are being under-utilized.

In action 2, the NFVO can receive the request to terminate the existing VNF instance from the NM. The NFVO can validate the request received from the NM. In addition, the NFVO can validate a VNF load associated with the existing VNF instance. If the NFVO determines that the VNF load associated with the existing VNF instance can be carried by a non-virtualized NE, then the NFVO can send a request to a VNF manager (VNFM) to terminate the existing VNF instance. If the NFVO determines that the VNF load associated with the existing VNF instance cannot be carried by the non-virtualized NE, then the NFVO can reject the termination request received from the NM.

In action 3, the VNFM can receive the request to terminate the existing VNF instance from the VNFO. The VNFM can initiate the termination of the existing VNF instance. The VNFM can gradually shut down or terminate the existing VNF instance, so that user equipments (UEs) that are currently connected to the existing VNF instance do not lose their connection. In other words, the VNFM can gracefully shut down the existing VNF instance. In one example, the VNFM can coordinate with other 3GPP network nodes in order to gracefully shut down the existing VNF instance.

In action 4, the VNFM can terminate the existing VNF instance, and then send an acknowledgement to the NFVO after successfully terminating the VNF instance.

In action 5, the NFVO can receive the acknowledgement from the VNFM indicating that the existing VNF instance has been terminated. The NFVO can send a request to a virtualized infrastructure manager (VIM) to delete the virtualized resources (e.g., compute, storage, and network) used by the various virtualization deployment units (VDUs) of the VNF instance that has now been terminated.

In action 6, the VIM can receive the request from the NFVO. The VIM can delete the connectivity (e.g., networking), compute (e.g., virtual machines), and storage resources of the various VDUs of the VNF instance that has now been terminated. The VIM can send an acknowledgement to the NFVO indicating a completion of the resource release.

In action 7, the NFVO can receive the acknowledgement from the VIM. The NFVO can send an acknowledgement to the NM and a NFV network manager (NFV NM) indicating completion of the VNF termination.

In action 8, the NM can receive the acknowledgement from the NFVO. The NM can configure an element manager (EM) to indicate that the VNF instance has now been terminated. The VNF termination procedure can be completed when the VNF instance has been terminated.

As a non-limiting example, the NM can detect that an existing VNF instance with mobility management entity (MME) functionality is being under-utilized (e.g., virtualized computing resources are being wasted at the virtualized MME). The NM can trigger a termination of the existing VNF instance in order to conserve virtualized computing resources. The VNF termination procedure as described above can be completed, and the existing VNF instance can be terminated. The existing VNF instance with MME functionality can be gradually shut down so UEs currently connected to the existing VNF instance do not abruptly lose their connection. For example, the existing VNF instance with MME functionality (i.e., the MME VNF instance) can start offloading the UEs to a non-virtualized MME NE prior to termination of the existing VNF instance.

FIG. 4 illustrates an exemplary procedure for expanding virtualized resources for a virtualized network function (VNF) instance. The mixed wireless network can include non-virtualized network elements that are co-located with virtualized network elements. VNF expansion operations of the network function virtualization (NVF) lifecycle management can be used to allocate additional capacity to a virtual network function (VNF) instance in the mixed wireless network when the VNF instance is overloaded. The VNF expansion can refer to the addition of virtualized resource capacity to an existing VNF instance. The VNF expansion can result in a scale-out of an existing VNF instance by allocating additional VNF components (VNFCs) to support additional virtualized resource capacity, or the VNF expansion can result in a scale-up of virtualized resources in the existing VNF instance/VNFCs. In this configuration, the trigger point for the VNF expansion can be at a NFV element manager (EM). The VNF expansion can occur when the network function virtualization (NFV) management and orchestration operation, as well as the 3GPP management operation, are both active.

The VNF expansion procedure can begin when the NFV EM detects that an existing VNF instance is overloaded. In one example, the existing VNF instance can be overloaded when user traffic for the existing VNF instance is above a defined level. The NFV EM can detect that the existing VNF instance is overloaded by monitoring performance (PM) data that is received from the existing VNF instance, and the NFV EM can determine to trigger VNF expansion based on the existing VNF instance being overloaded. Therefore, in this configuration, the VNF expansion can be triggered at the NFV EM.

In action 1 of the VNF expansion procedure, the NFV EM can send a request to a VNF manager (VNFM) to expand the existing VNF instance. In other words, the request can be for allocating additional virtualized resources for the existing VNF instance. The VNFM can be included in a NFV management and network orchestration (NFV-MANO), wherein the NFV-MANO can be a functional entity in the 3GPP NFV management architecture. The NFV EM can send the request to the VNFM upon detecting that the existing VNF instance is overloaded.

In action 2, the VNFM can receive the request to expand the existing VNF instance from the NFV EM. The VNFM can request granting from the NFVO for allocating additional virtual resources, such as additional virtual machines (VMs), for the existing VNF instance. In other words, the VNFM can request the NFVO to scale-out or scale-up the existing VNF instance. The VNFM can perform the request based on specifications listed in a VNF descriptor (VNFD), wherein the specifications can be related to processing capability, memory, Internet Protocol (IP), etc.

In action 3, the NFVO can receive the request for the allocation of additional virtual resources from the VNFM. The NFVO can check the request against a capacity database for free resource availability, and if the additional virtual resources are available, the NFVO can grant the operation of the VNF expansion to the VNFM. In other words, the NFVO can grant the allocation of additional virtual resources for the existing VNF instance to be expanded.

In action 4, the VNFM can receive an indication of the grant from the NFVO. The VNFM can send a request to a virtualized infrastructure manager (VIM) to expand or increase the virtual resources for the existing VNF instance, as instructed by the NFVO. The VIM can also be included in the NFV-MANO, along with the VNFM and the NFVO.

In action 5, the VIM can receive the request from the VNFM. The VIM can allocate the additional virtual resources (e.g., the VIM can create and start the VMs) for the existing VNF instance. In other words, the VIM can instantiate and start the VMs, as well as the relevant networking resources. In addition, the VIM can acknowledge successful allocation of the additional virtual resources to the VNFM.

In action 6, the VNFM can receive the acknowledgement from the VIM indicating that the additional virtual resources have been successfully allocated for the existing VNF instance. The VNFM can configure VNF data specific to the VNF expansion. In addition, the VNFM can notify the NFV EM that the existing VNF instance has been updated with additional virtual resources and capacity. The VNF expansion procedure can be completed when the existing VNF instance has been expanded.

As a non-limiting example, the NFV EM can detect that an existing VNF instance with mobility management entity (MME) functionality is overloaded. The NFV EM can trigger an expansion of the existing VNF instance in order to increase the computing capability of the existing VNF instance. In other words, the expansion of the existing VNF instance can involve increasing compute, storage, networking, etc. at the existing VNF instance with MME functionality. The VNF expansion procedure as described above can be completed, and additional virtualized resources can be allocated for the existing VNF instance. Therefore, the existing VNF instance with MME functionality can be equipped to handle an increased network load.

FIG. 5 illustrates an exemplary procedure for expanding virtualized resources for a virtualized network function (VNF) instance. The mixed wireless network can include non-virtualized network elements that are co-located with virtualized network elements. VNF expansion operations of the network function virtualization (NFV) lifecycle management can be used to add capacity to a virtual network function (VNF) instance in the mixed wireless network when the VNF instance is overloaded. The VNF expansion can refer to the addition of virtualized resource capacity to an existing VNF instance. The VNF expansion can result in a scale-out of an existing VNF instance by allocating additional VNF components (VNFCs) to support additional virtualized resource capacity, or the VNF expansion can result in a scale-up of virtualized resources in the existing VNF instance/VNFCs. In this configuration, the trigger point for the VNF expansion can be at a VNF manager (VNFM). The VNF expansion can occur when the network function virtualization (NFV) management and orchestration operation, as well as the 3GPP management operation, are both active.

The VNF expansion procedure can begin when the VNFM detects that an existing VNF instance is overloaded. The VNFM can detect that the existing VNF instance is overloaded by monitoring performance (PM) data that is received from the existing VNF instance, and the VNFM can determine to trigger VNF expansion based on the existing VNF instance being overloaded.

In action 1 of the VNF expansion procedure, the VNFM can request granting from a NFV orchestrator (NFVO) for allocating additional virtual resources, such as additional virtual machines (VMs), for the existing VNF instance. In other words, the VNFM can request the NFVO to scale-out or scale-up the existing VNF instance. The VNFM can perform the request based on specifications listed in a VNF descriptor (VNFD), wherein the specifications can be related to processing capability, memory, Internet Protocol (IP), etc.

In action 2, the NFVO can receive the request for the allocation of additional virtual resources from the VNFM. The NFVO can check the request against a capacity database for free resource availability, and if the additional virtual resources are available, the NFVO can grant the operation of the VNF expansion to the VNFM. In other words, the NFVO can grant the allocation of additional virtual resources for the existing VNF instance to be expanded.

In action 3, the VNFM can receive an indication of the grant from the NFVO. The VNFM can send a request to a virtualized infrastructure manager (VIM) to expand or increase the virtual resources for the existing VNF instance, as instructed by the NFVO.

In action 4, the VIM can receive the request from the VNFM. The VIM can allocate the additional virtual resources (e.g., the VIM can create and start the VMs) for the existing VNF instance. In other words, the VIM can instantiate and start the VMs, as well as the relevant networking resources. In addition, the VIM can acknowledge successful allocation of the additional virtual resources to the VNFM.

In action 5, the VNFM can receive the acknowledgement from the VIM indicating that the additional virtual resources have been successfully allocated for the existing VNF instance. The VNFM can configure VNF data specific to the VNF expansion. In addition, the VNFM can notify the NFV EM that the existing VNF instance has been updated with additional virtual resources and capacity. The VNF expansion procedure can be completed when the existing VNF instance has been expanded.

FIG. 6 illustrates an exemplary procedure for expanding virtualized resources for a virtualized network function (VNF) instance. The mixed wireless network can include non-virtualized network elements that are co-located with virtualized network elements. VNF expansion operations of the network function virtualization function (NFV) lifecycle management can be used to add capacity to a virtual network function (VNF) instance in the mixed wireless network when the VNF instance is overloaded. The VNF expansion can refer to the addition of virtualized resource capacity to an existing VNF instance. The VNF expansion can result in a scale-out of an existing VNF instance by allocating additional VNF components (VNFCs) to support additional virtualized resource capacity, or the VNF expansion can result in a scale-up of virtualized resources in the existing VNF instance/VNFCs. In this configuration, the trigger point for the VNF expansion can be at a NFV network manager (NFV NM). The VNF expansion can occur when the network function virtualization (NFV) management and orchestration operation, as well as the 3GPP management operation, are both active.

The VNF expansion procedure can begin when the NFV NM detects that an existing VNF instance is overloaded. The NFV NM can detect that the existing VNF instance is overloaded by monitoring performance (PM) data that is received from an element manager (EM), and the NFV NM can determine to trigger VNF expansion based on the existing VNF instance being overloaded.

In action 1 of the VNF expansion procedure, the NFV NM can send a request to a NFV orchestrator (NFVO) to expand the existing VNF instance. In other words, the request can be for allocating additional virtualized resources for the existing VNF instance. The NFV NM can send the request to the NFVO upon detecting that the existing VNF instance is overloaded.

In action 2, the NFVO can receive the request for the allocation of additional virtual resources from the NFV NM. The NFVO can perform any necessary verification and/or processing of the request received from the NFV NM. The NFVO can send a request to the VNF manager (VNFM) to expand the existing VNF instance. In other words, the NFVO can send the request in order to request that additional virtual resources be allocated for the existing VNF instance.

In action 3, the VNFM can receive the request to expand the existing VNF instance from the NFVO. The VNFM can request granting from the NFVO for allocating additional virtual resources, such as additional virtual machines (VMs), for the existing VNF instance. In other words, the VNFM can request the NFVO to scale-out or scale-up the existing VNF instance. The VNFM can perform the request based on specifications listed in a VNF descriptor (VNFD), wherein the specifications can be related to processing capability, memory, Internet Protocol (IP), etc.

In action 4, the NFVO can receive the request for the allocation of additional virtual resources from the VNFM. The NFVO can check the request against a capacity database for free resource availability, and if the additional virtual resources are available, the NFVO can grant the operation of the VNF expansion to the VNFM. In other words, the NFVO can grant the allocation of additional virtual resources for the existing VNF instance to be expanded.

In action 5, the VNFM can receive an indication of the grant from the NFVO. The VNFM can send a request to a virtualized infrastructure manager (VIM) to expand or increase the virtual resources for the existing VNF instance, as instructed by the NFVO.

In action 6, the VIM can receive the request from the VNFM. The VIM can allocate the additional virtual resources (e.g., the VIM can create and start the VMs) for the existing VNF instance. In other words, the VIM can instantiate and start the VMs, as well as the relevant networking resources. In addition, the VIM can acknowledge successful allocation of the additional virtual resources to the VNFM.

In action 7, the VNFM can receive the acknowledgement from the VIM indicating that the additional virtual resources have been successfully allocated for the existing VNF instance. The VNFM can configure VNF data specific to the VNF expansion. The VNFM can notify the NFV EM that the existing VNF instance has been updated with additional virtual resources and capacity. The VNF expansion procedure can be completed when the existing VNF instance has been expanded. In addition, the VNFM can send an acknowledgement of the completion of the VNF expansion to the NFVO.

In action 8, the NFVO can send an acknowledgement of the completion of the VNF expansion to the NFV NM. The VNF expansion procedure can be completed when the existing VNF instance has been expanded.

FIG. 7 illustrates an exemplary procedure for contracting virtualized resources for a virtualized network function (VNF) instance. The mixed wireless network can include non-virtualized network elements that are co-located with virtualized network elements. VNF contraction operations of the network function virtualization (NFV) lifecycle management can be used to reduce capacity to a virtual network function (VNF) instance in the mixed wireless network when the VNF instance is unnecessarily wasting capacity. The VNF contraction can refer to the reduction of virtualized resource capacity to an existing VNF instance. The VNF contraction can result in a scale-in of an existing VNF instance by removing VNF components (VNFCs) to free up virtualized resource capacity, or the VNF contraction can result in a scale-down of virtualized resources (e.g., computing and memory resources) for the existing VNF instance/VNFCs. In this configuration, the trigger point for the VNF contraction can be at a NFV element manager (EM). The VNF contraction can occur when the network function virtualization (NFV) management and orchestration operation, as well as the 3GPP management operation, are both active.

The VNF contraction procedure can begin when the NFV EM detects that virtual resources and computing capacity associated with an existing VNF instance are being unused and wasted. In one example, the computing capacity of the existing VNF instance can be wasted when user traffic for the existing VNF instance is below a defined level. The NFV EM can detect that the existing VNF instance is under-utilized by monitoring performance (PM) data that is received from the existing VNF instance, and the NFV EM can determine to trigger VNF contraction based on the existing VNF instance being under-utilized. Therefore, in this configuration, the VNF contraction can be triggered at the NFV EM.

In action 1 of the VNF contraction procedure, the NFV EM can send a request to a VNF manager (VNFM) to contract the existing VNF instance. In other words, the request can be for removing virtualized resources for the existing VNF instance. The VNFM can be included in a NFV management and network orchestration (NFV-MANO), wherein the NFV-MANO can be a functional entity in the 3GPP NFV management architecture. The NFV EM can send the request to the VNFM upon detecting that the existing VNF instance is being under-utilized.

In action 2, the VNFM can receive the request to contract the existing VNF instance from the NFV EM. The VNFM can request granting from the NFVO for removing virtual resources, such as virtual machines (VMs), with respect to the existing VNF instance. In other words, the VNFM can request the NFVO to scale-in or scale-down the existing VNF instance. The VNFM can perform the request based on specifications listed in a VNF descriptor (VNFD), wherein the specifications can be related to processing capability, memory, Internet Protocol (IP), etc.

In action 3, the NFVO can receive the request for the removal of the virtual resources from the VNFM. The NFVO can check the request against a configuration policy, and if permissible, the NFVO can grant the operation of the VNF contraction to the VNFM. In other words, the NFVO can grant the removal of virtual resources, such that the existing VNF instance can be contracted.

In action 4, the VNFM can receive the grant to remove the virtual resources from the NFVO. The VNFM can request the existing VNF instance to gradually terminate a VNF component, so that user equipments (UEs) that are currently connected using the VNF component do not suddenly lose their connection. In other words, the VNFM can request the existing VNF instance to gracefully shut down the VNF component. In addition, the VNFM can send a request to a virtualized infrastructure manager (VIM) to release certain virtual resources that are associated with the existing VNF instance, as instructed by the NFVO.

In action 5, the VIM can receive the request from the VNFM. The VIM can release the virtual resources (e.g., the VIM can remove the VMs) for the existing VNF instance. In addition, the VIM can acknowledge successful removal of the virtual resources to the VNFM.

In action 6, the VNFM can receive the acknowledgement from the VIM indicating that the virtual resources have been successfully removed for the existing VNF instance. The VNFM can notify the NFVO of the contraction of the existing VNF instance. In addition, the VNFM can send an acknowledgement to the NFV EM indicating that the existing VNF instance has been updated with a requested capacity release. The VNF contraction procedure can be completed when the existing VNF instance has been contracted.

As a non-limiting example, the NFV EM can detect that an existing VNF instance with mobility management entity (MME) functionality is being under-utilized. The NFV EM can trigger a contraction of the existing VNF instance in order to reduce the computing capability of the existing VNF instance. In other words, the contraction of the existing VNF instance can involve removing compute, storage, networking, etc. at the existing VNF instance with MME functionality. The VNF contraction procedure as described above can be completed, and virtualized resources can be removed for the existing VNF instance. Therefore, the existing VNF instance with MME functionality can be equipped to more efficiently handle a reduced network load.

FIG. 8 illustrates an exemplary procedure for contracting virtualized resources for a virtualized network function (VNF) instance. The mixed wireless network can include non-virtualized network elements that are co-located with virtualized network elements. VNF contraction operations of the network function virtualization (NFV) lifecycle management can be used to reduce capacity to a virtual network function (VNF) instance in the mixed wireless network when the VNF instance is unnecessarily wasting capacity. The VNF contraction can refer to the reduction of virtualized resource capacity to an existing VNF instance. The VNF contraction can result in a scale-in of an existing VNF instance by removing VNF components (VNFCs) to free up virtualized resource capacity, or the VNF contraction can result in a scale-down of virtualized resources (e.g., computing and memory resources) for the existing VNF instance/VNFCs. In this configuration, the trigger point for the VNF contraction can be at a VNF manager (VNFM). The VNF contraction can occur when the network function virtualization (NFV) management and orchestration operation, as well as the 3GPP management operation, are both active.

The VNF contraction procedure can begin when the VNFM detects that virtual resources and computing capacity associated with an existing VNF instance are being unused and wasted. The VNFM can detect that the existing VNF instance is under-utilized by monitoring performance (PM) data that is received from the existing VNF instance, and the VNFM can determine to trigger VNF contraction based on the existing VNF instance being under-utilized. Therefore, in this configuration, the VNF contraction can be triggered at the VNFM.

In action 1 of the VNF contraction procedure, the VNFM can request granting from a NFV orchestrator (NFVO) for removing virtual resources, such as virtual machines (VMs), with respect to the existing VNF instance. In other words, the VNFM can request the NFVO to scale-in or scale-down the existing VNF instance. The VNFM can perform the request based on specifications listed in a VNF descriptor (VNFD), wherein the specifications can be related to processing capability, memory, Internet Protocol (IP), etc.

In action 2, the NFVO can receive the request for the removal of virtual resources from the VNFM. The NFVO can check the request against a configuration policy, and if permissible, the NFVO can grant the operation of the VNF contraction to the VNFM.

In action 3, the VNFM can receive an indication of the grant from the NFVO. The VNFM can request the existing VNF instance to gradually terminate a VNF component, so that user equipments (UEs) that are currently connected using the VNF component do not suddenly lose their connection. In other words, the VNFM can request the existing VNF instance to gracefully shut down the VNF component. In addition, the VNFM can send a request to a virtualized infrastructure manager (VIM) to release certain virtual resources that are associated with the existing VNF instance, as instructed by the NFVO.

In action 4, the VIM can receive the request from the VNFM. The VIM can release the virtual resources (e.g., the VIM can remove the VMs) for the existing VNF instance. In addition, the VIM can acknowledge successful removal of the virtual resources to the VNFM.

In action 5, the VNFM can receive the acknowledgement from the VIM indicating that the virtual resources have been successfully removed for the existing VNF instance. The VNFM can notify the NFVO of the contraction of the existing VNF instance. In addition, the VNFM can send an acknowledgement to the NFV EM indicating that the existing VNF instance has been updated with a requested capacity release. The VNF contraction procedure can be completed when the existing VNF instance has been contracted.

FIG. 9 illustrates an exemplary procedure for contracting virtualized resources for a virtualized network function (VNF) instance. The mixed wireless network can include non-virtualized network elements that are co-located with virtualized network elements. VNF contraction operations of the network function virtualization (NFV) lifecycle management can be used to reduce capacity to a virtual network function (VNF) instance in the mixed wireless network when the VNF instance is unnecessarily wasting capacity. The VNF contraction can refer to the reduction of virtualized resource capacity to an existing VNF instance. The VNF contraction can result in a scale-in of an existing VNF instance by removing VNF components (VNFCs) to free up virtualized resource capacity, or the VNF contraction can result in a scale-down of virtualized resources (e.g., computing and memory resources) for the existing VNF instance/VNFCs. In this configuration, the trigger point for the VNF contraction can be at a NFV network manager (NFV NM). The VNF contraction can occur when the network function virtualization (NFV) management and orchestration operation, as well as the 3GPP management operation, are both active.

The VNF contraction procedure can begin when the NFV NM detects that virtual resources and computing capacity associated with an existing VNF instance are being unused and wasted. The NFV NM can detect that the existing VNF instance is under-utilized by monitoring performance (PM) data that is received from the existing VNF instance, and the NFV NM can determine to trigger VNF contraction based on the existing VNF instance being under-utilized. Therefore, in this configuration, the VNF contraction can be triggered at the NFV NM.

In action 1 of the VNF contraction procedure, the NFV NM can send a request to a NFV orchestrator (NFVO) to contract the existing VNF instance. In other words, the request can be for removing virtualized resources with respect to the existing VNF instance. The NFV NM can send the request to the NFVO upon detecting that the existing VNF instance is being under-utilized.

In action 2, the NFVO can receive the request for removal of the virtual resources from the NFV NM. The NFVO can perform any necessary verification and/or processing of the request received from the NFV NM. The NFVO can send a request to the VNF manager (VNFM) to contract the existing VNF instance. In other words, the NFVO can send the request in order to request that virtual resources be removed for the existing VNF instance.

In action 3, the VNFM can receive the request to contract the existing VNF instance from the NFVO. The VNFM can request granting from the NFVO for removing virtual resources, such as virtual machines (VMs), with respect to the existing VNF instance. In other words, the VNFM can request the NFVO to scale-in or scale-down the existing VNF instance. The VNFM can perform the request based on specifications listed in a VNF descriptor (VNFD), wherein the specifications can be related to processing capability, memory, Internet Protocol (IP), etc.

In action 4, the NFVO can receive the request for the removal of virtual resources from the VNFM. The NFVO can check the request against a configuration policy, and if permissible, the NFVO can grant the operation of the VNF contraction to the VNFM.

In action 5, the VNFM can receive an indication of the grant from the NFVO. The VNFM can request the existing VNF instance to gradually terminate a VNF component, so that user equipments (UEs) that are currently connected using the VNF component do not suddenly lose their connection. In other words, the VNFM can request the existing VNF instance to gracefully shut down the VNF component. In addition, the VNFM can send a request to a virtualized infrastructure manager (VIM) to release certain virtual resources that are associated with the existing VNF instance, as instructed by the NFVO.

In action 6, the VIM can receive the request from the VNFM. The VIM can release the virtual resources (e.g., the VIM can remove the VMs) for the existing VNF instance. In addition, the VIM can acknowledge successful removal of the virtual resources to the VNFM.

In action 7, the VNFM can receive the acknowledgement from the VIM indicating that the virtual resources have been successfully removed for the existing VNF instance. The VNFM can notify the NFVO of the contraction of the existing VNF instance. In addition, the VNFM can send an acknowledgement to the NFV EM indicating that the existing VNF instance has been updated with a requested capacity release.

In action 8, the NFVO can send an acknowledgement of the completion of the VNF contraction to the NFV NM. The VNF contraction procedure can be completed when the existing VNF instance has been contracted.

Figure 10:
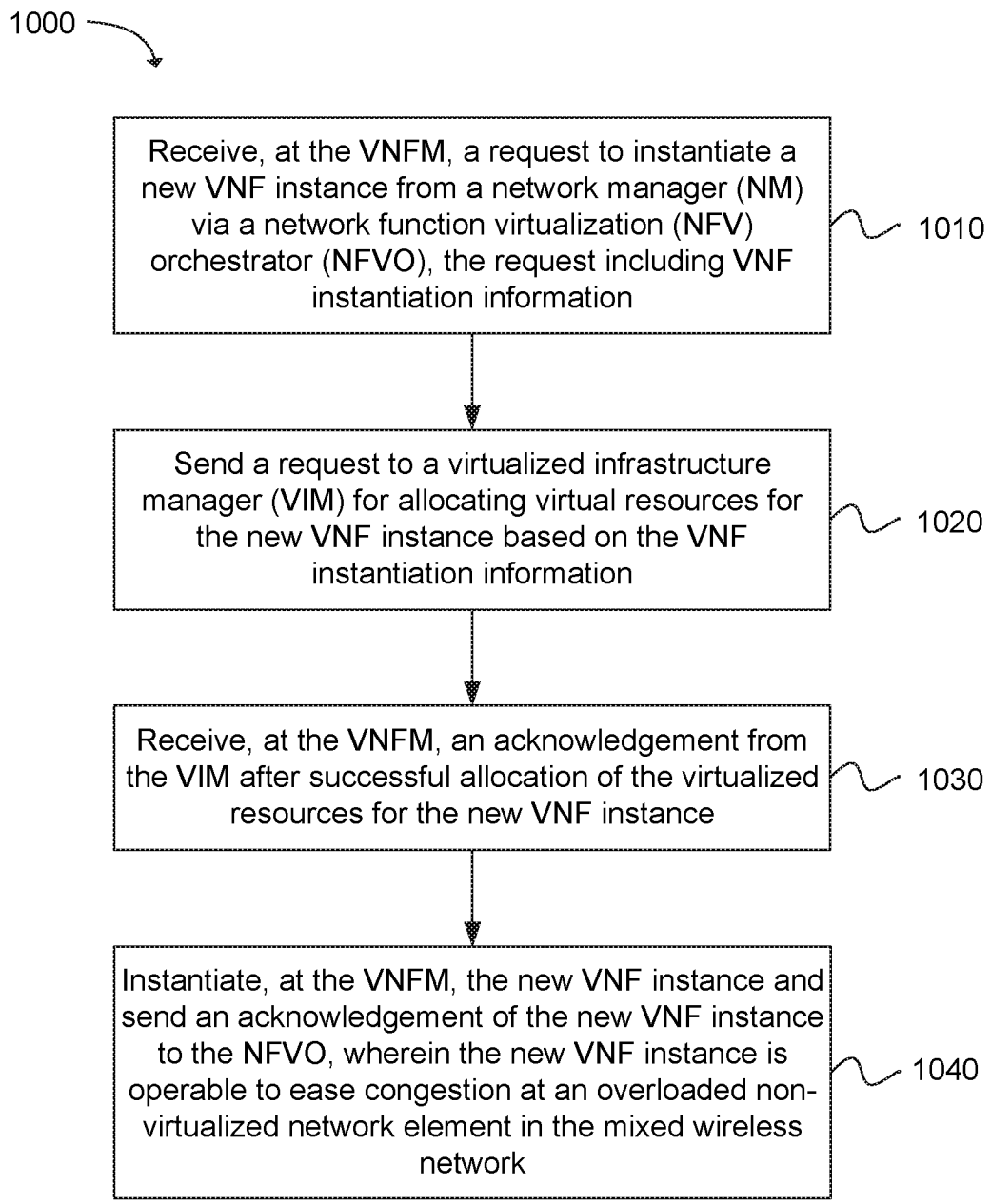
FIG. 10 depicts functionality of a virtualized network function manager (VNFM) in a mixed wireless network operable to facilitate instantiation of a virtualized network function (VNF) instance in accordance with an example.

Another example provides functionality 1000 of a virtualized network function manager (VNFM) in a mixed wireless network operable to facilitate instantiation of a virtualized network function (VNF) instance, as shown in the flow chart in FIG. 10. The functionality can be implemented as a method or the functionality can be executed as instructions on a machine, where the instructions are included on at least one computer readable medium or one non-transitory machine readable storage medium. The VNFM can include one or more processors configured to receive, at the VNFM, a request to instantiate a new VNF instance from a network manager (NM) via a network function virtualization (NFV) orchestrator (NFVO), the request including VNF instantiation information, as in block 1010. The VNFM can include one or more processors configured to send a request to a virtualized infrastructure manager (VIM) for allocating virtual resources for the new VNF instance based on the VNF instantiation information, as in block 1020. The VNFM can include one or more processors configured to receive, at the VNFM, an acknowledgement from the VIM after successful allocation of the virtualized resources for the new VNF instance, as in block 1030. The VNFM can include one or more processors configured to instantiate, at the VNFM, the new VNF instance and send an acknowledgement of the new VNF instance to the NFVO, wherein the new VNF instance is operable to ease congestion at an overloaded non-virtualized network element in the mixed wireless network, as in block 1040.

In one example, the request to instantiate the new VNF instance is initially triggered at the NM in the mixed wireless network upon detection that the non-virtualized network element in the mixed wireless network is overloaded. In one example, the wireless network includes non-virtualized network elements that are collocated with virtualized network elements. In one example, the one or more processors are further configured to configure one or more lifecycle parameters for the new VNF instance.

In one example, the one or more processors are further configured to notify a NFV element manager (EM) of the new VNF instance that is instantiated, wherein the NFV EM is configured to configure VNF application specific parameters. In one example, the one or more processors are further configured to request permission from the NFVO for allocation of the virtualized resources prior to sending the request to the VIM for allocating the virtualized resources, wherein the NFVO is configured to verify the request and grant the allocation of the virtualized resources for the new VNF instance.

In one example, the new VNF instance is available for offloading by an element manager (EM) in the mixed wireless network. In another example, the new VNF instance is instantiated in order to run a virtualized evolved node B (eNB), a virtualized radio base station, a virtualized baseband unit (BBU), a virtualized mobility management entity (MME), a virtualized serving gateway (SGW) or a virtualized packet data network (PDN) gateway (PGW).

Figure 11:
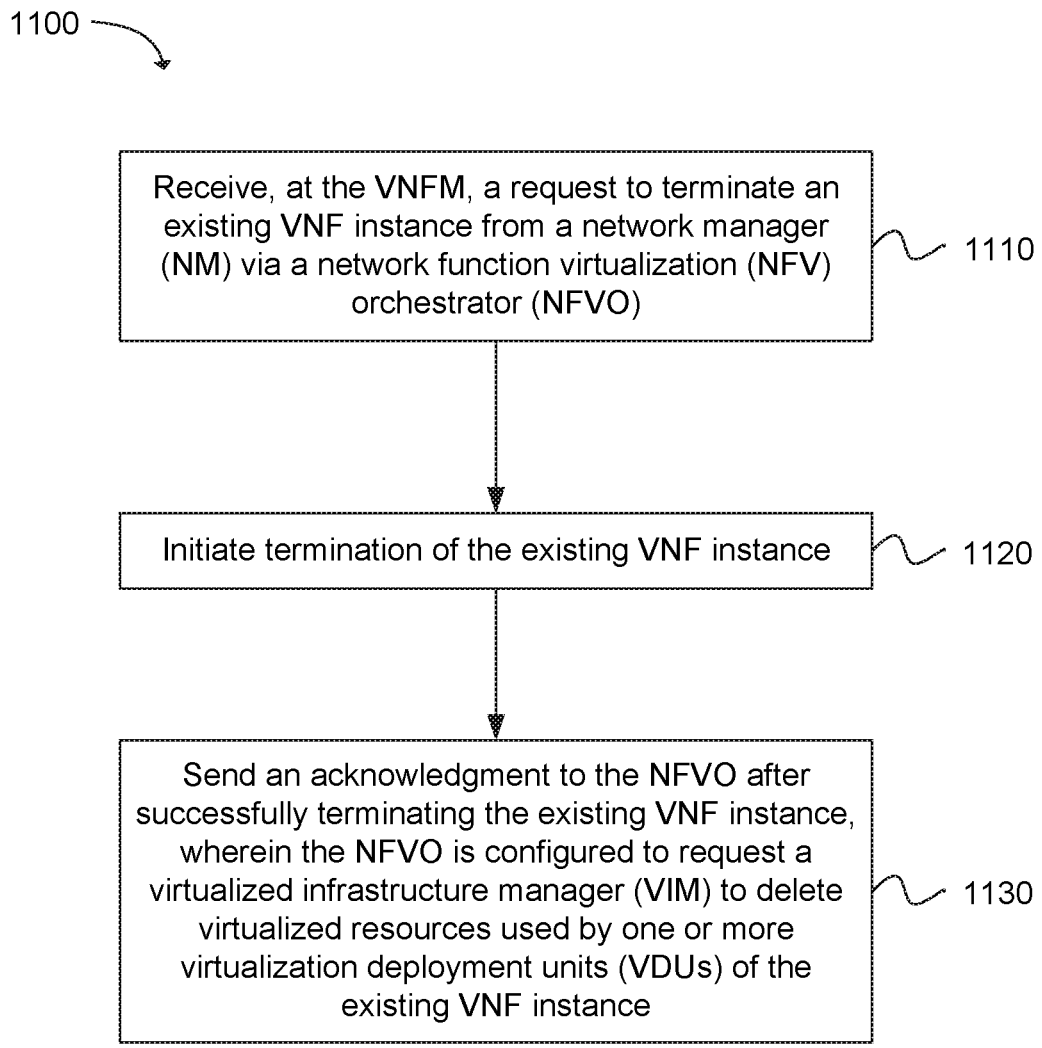
FIG. 11 depicts functionality of a virtualized network function manager (VNFM) in a mixed wireless network operable to facilitate termination of a virtualized network function (VNF) instance in accordance with an example.

Another example provides functionality 1100 of a virtualized network function manager (VNFM) in a mixed wireless network operable to facilitate termination of a virtualized network function (VNF) instance, as shown in the flow chart in FIG. 11. The functionality can be implemented as a method or the functionality can be executed as instructions on a machine, where the instructions are included on at least one computer readable medium or one non-transitory machine readable storage medium. The VNFM can include one or more processors configured to receive, at the VNFM, a request to terminate an existing VNF instance from a network manager (NM) via a network function virtualization (NFV) orchestrator (NFVO), as in block 1110. The VNFM can include one or more processors configured to initiate termination of the existing VNF instance, as in block 1120. The VNFM can include one or more processors configured to send an acknowledgment to the NFVO after successfully terminating the existing VNF instance, wherein the NFVO is configured to request a virtualized infrastructure manager (VIM) to delete virtualized resources used by one or more virtualization deployment units (VDUs) of the existing VNF instance, as in block 1130.

In one example, the request to terminate the existing VNF instance is received from the NFVO when the NFVO determines that a non-virtualized network element in the mixed wireless network is able to handle a VNF instance load associated with the existing VNF instance. In one example, the request to terminate the existing VNF instance is initially triggered at the NM in the mixed wireless network upon detection that the virtualized network element in the mixed wireless network is unnecessarily wasting virtualized resources.

In one example, the VNFM coordinates with other nodes in the mixed wireless network to gradually shut down the existing VNF instance, wherein user equipments UEs of the mixed wireless network that are currently connected to the existing VNF instance are offloaded to a non-virtualized network element in the mixed wireless network prior to termination of the existing VNF instance. In one example, an element manager (EM) in the mixed wireless network is notified when the existing VNF instance is terminated.

In one example, the mixed wireless network is operable to support a Third Generation Partnership Project (3GPP) Release 13 network functions virtualization (NFV) management architecture that includes a management architecture for managing non-virtualized and virtualized network elements, and a NFV management and network orchestration (MANO) architectural framework.

Figure 12:
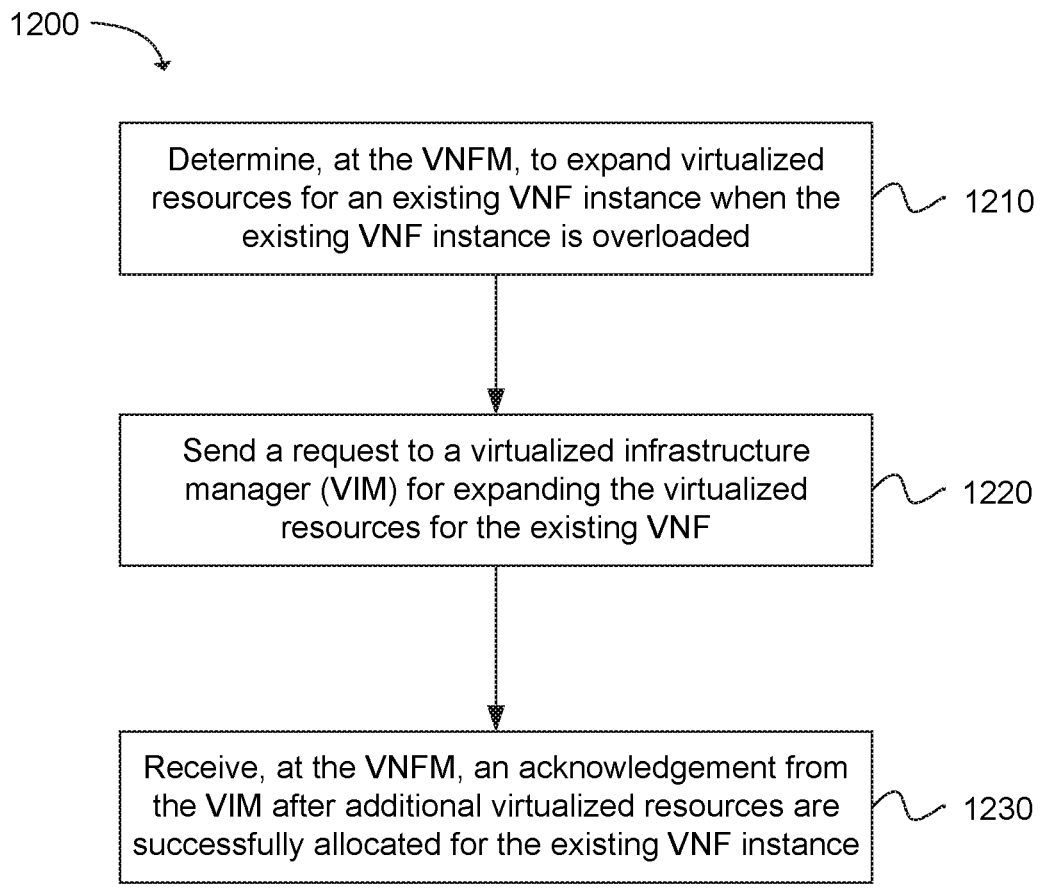
FIG. 12 depicts functionality of a virtualized network function manager (VNFM) in a mixed wireless network operable to facilitate expansion of virtualized resources for a virtualized network function (VNF) instance in accordance with an example.

Another example provides functionality 1200 of a virtualized network function manager (VNFM) in a mixed wireless network operable to facilitate expansion of virtualized resources for a virtualized network function (VNF) instance, as shown in the flow chart in FIG. 12. The functionality can be implemented as a method or the functionality can be executed as instructions on a machine, where the instructions are included on at least one computer readable medium or one non-transitory machine readable storage medium. The VNFM can include one or more processors configured to determine, at the VNFM, to expand virtualized resources for an existing VNF instance when the existing VNF instance is overloaded, as in block 1210. The VNFM can include one or more processors configured to send a request to a virtualized infrastructure manager (VIM) for expanding the virtualized resources for the existing VNF, as in block 1220. The VNFM can include one or more processors configured to receive, at the VNFM, an acknowledgement from the VIM after additional virtualized resources are successfully allocated for the existing VNF instance, as in block 1230.

In one example, the one of more processors are configured to determine to expand the virtualized resources for the existing VNF instance after receiving an expansion request from a NFV element manager (EM), wherein the NFV EM is configured to detect that the existing VNF instance is overloaded based on performance data received from the existing VNF instance and send the expansion request to the VNFM.

In one example, the one or more processors are configured to determine to expand the virtualized resources for the existing VNF instance after receiving an expansion request from a NFV network manager (NM) via a network function virtualization (NFV) orchestrator (NFVO), wherein the NFV VM is configured to detect that the existing VNF instance is overloaded based on performance data received from the existing VNF instance and send the expansion request to the NFVO, wherein the NFVO is configured to forward the expansion request to the VNFM.

In one example, the one or more processors are further configured to request permission from the NFVO for expansion of the virtualized resources prior to sending the request to the VIM for expanding the virtualized resources, wherein the NFVO is configured to verify the request with respect to virtualized resource availability and grant the expansion of the virtualized resources for the existing VNF instance. In one example, the one or more processors are further configured to notify a NFV EM in the mixed wireless network that the existing VNF instance is updated with additional virtualized resources.

Figure 13:
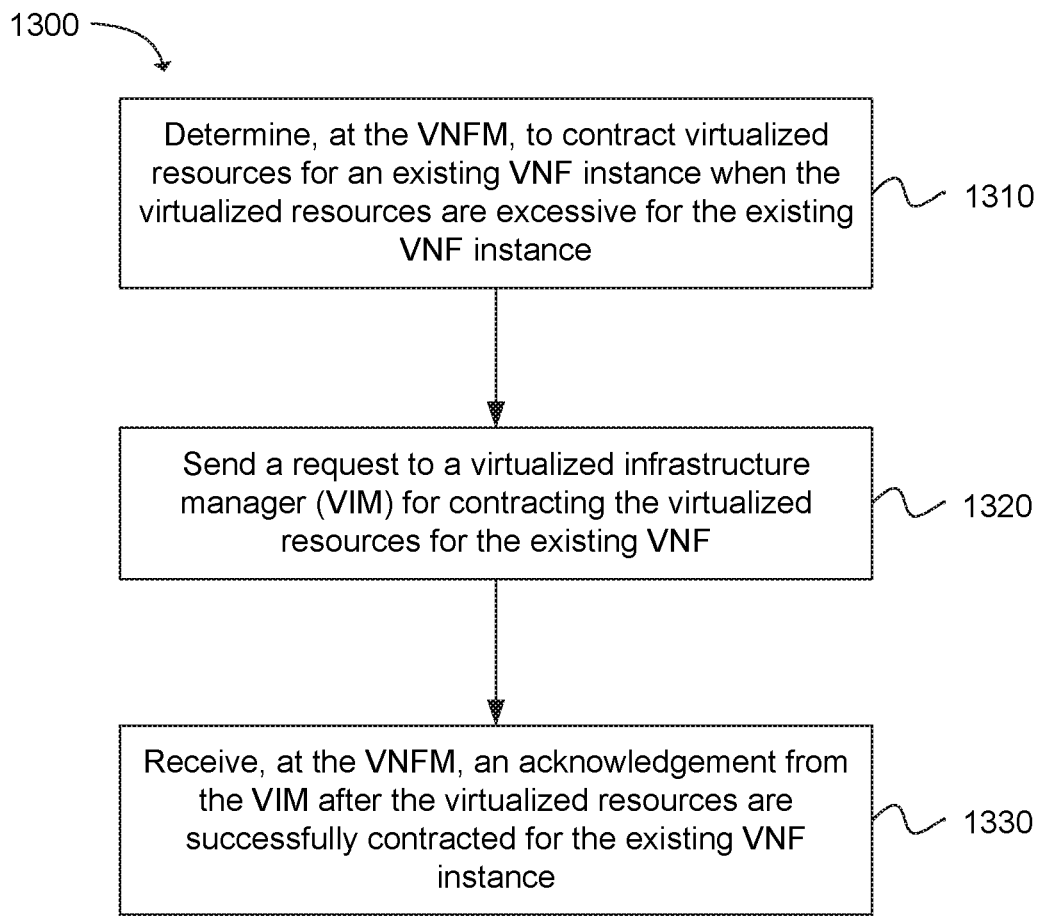
FIG. 13 depicts functionality of a virtualized network function manager (VNFM) in a mixed wireless network operable to facilitate contraction of virtualized resources for a virtualized network function (VNF) instance in accordance with an example.

Another example provides functionality 1300 of a virtualized network function manager (VNFM) in a mixed wireless network operable to facilitate contraction of virtualized resources for a virtualized network function (VNF) instance, as shown in the flow chart in FIG. 13. The functionality can be implemented as a method or the functionality can be executed as instructions on a machine, where the instructions are included on at least one computer readable medium or one non-transitory machine readable storage medium. The VNFM can include one or more processors configured to determine, at the VNFM, to contract virtualized resources for an existing VNF instance when the virtualized resources are excessive for the existing VNF instance, as in block 1310. The VNFM can include one or more processors configured to send a request to a virtualized infrastructure manager (VIM) for contracting the virtualized resources for the existing VNF, as in block 1320. The VNFM can include one or more processors configured to receive, at the VNFM, an acknowledgement from the VIM after the virtualized resources are successfully contracted for the existing VNF instance, as in block 1330.

In one example, the one or more processors are configured to trigger contraction of the virtualized resources for the existing VNF instance based on monitoring of performance data received from the existing VNF instance. In one example, the one or more processors are configured to determine to contract the virtualized resources for the existing VNF instance after receiving a contraction request from a NFV element manager (EM), wherein the NFV EM is configured to detect that the virtualized resources are excessive for the existing VNF instance and send the contraction request to the VNFM.

In one example, the one or more processors are configured to determine to contract the virtualized resources for the existing VNF instance after receiving a contraction request from a NFV network manager (NM) via a network function virtualization (NFV) orchestrator (NFVO), wherein the NFV NM is configured to detect that the virtualized resources are excessive for the existing VNF instance and send the contraction request to the NFVO, wherein the NFVO is configured to forward the contraction request to the VNFM.

In one example, the one or more processors are further configured to request permission from the NFVO for contraction of the virtualized resources prior to sending the request to the VIM for contracting the virtualized resources, wherein the NFVO is configured to verify the request with respect to a configuration policy and grant the contraction of the virtualized resources for the existing VNF instance.

In one example, the one or more processors are further configured to notify a NFV EM in the mixed wireless network after the virtualized resources are reduced for the existing VNF instance. In one example, the one or more processors are further configured to request the existing VNF instance to gradually terminate a VNF component, wherein user equipments (UEs) of the mixed wireless network that are currently connected to the existing VNF instance using the VNF component are transferred to another VNF component prior to termination of the VNF component.

Figure 14:
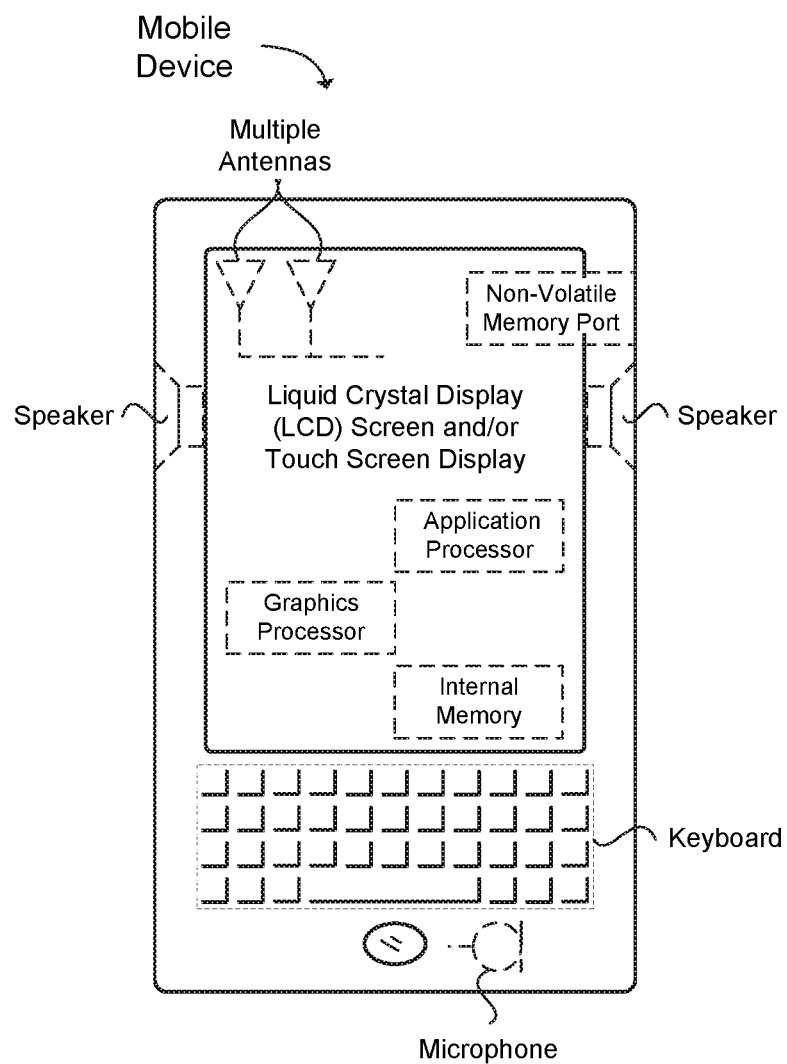
FIG. 14 illustrates a diagram of a wireless device (e.g., UE) in accordance with an example.

FIG. 14 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 14 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be integrated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a virtualized network function manager (VNFM) in a mixed wireless network operable to facilitate instantiation of a virtualized network function (VNF), the apparatus comprising:
   a memory storing instructions; and
   one or more processors configured to execute the instructions to:
   process, at the VNFM, a first request to instantiate a VNF from a network manager (NM) configured to provide network management for a non-virtualized portion of the mixed wireless network via a network function virtualization (NFV) orchestrator (NFVO), the first request including VNF instantiation information;
   generate, for sending from the VNFM to the NFVO, a second request for allocating virtual resources for the VNF based on the VNF instantiation information;
   process, at the VNFM, an acknowledgement from the NFVO after successful allocation of the virtualized resources for the VNF;
   instantiate, at the VNFM, the VNF;
   generate, for sending from the VNFM to an NFV element manager (EM), an acknowledgement of the VNF instantiations;
   generate, for sending from the VNFM via the NFVO to the NM configured to provide network management for a non-virtualized portion of the mixed wireless network, an acknowledgement of the VNF instantiation; and
   generate, for sending from the VNFM via the NFVO to an NFV NM configured to provide network management for a virtualized portion of the mixed wireless network, an acknowledgement of the VNF instantiation.

2. The apparatus of claim 1, wherein the successful allocation of the virtualized resources for the VNF is performed using a virtualized infrastructure manager (VIM) along with the NFVO.

3. The apparatus of claim 1, wherein the first request to instantiate the VNF received from the NM is validated at the NFVO.

4. The apparatus of claim 1, wherein the one or more processors are further configured to execute the instructions to configure, at the VNFM, one or more deployment parameters for the VNF.

5. The apparatus of claim 1, wherein the VNF is configured with application specific parameters by the EM.

6. The apparatus of claim 1, wherein the one or more processors are configured to execute the instructions to generate, for sending to the NFVO, the acknowledgement of the VNF instantiation.

7. A method of facilitating instantiation of a virtualized network function (VNF) in a mixed wireless network using an apparatus of a virtualized network function manager (VNFM), the method comprising:
   receiving, at the VNFM, a first request to instantiate a VNF from a network manager (NM) configured to provide network management for a non-virtualized portion of the mixed wireless network via a network function virtualization (NFV) orchestrator (NFVO), the first request including VNF instantiation information;
   sending, from the VNFM to the NFVO, a second request for allocating virtual resources for the VNF based on the VNF instantiation information;

receiving, at the VNFM, an acknowledgement from the NFVO after successful allocation of the virtualized resources for the VNF;

instantiating, at the VNFM, the VNF;

sending, from the VNFM to an NFV element manager (EM), an acknowledgement of the VNF instantiation;

sending, from the VNFM via the NFVO to the NM configured to provide network management for a non-virtualized portion of the mixed wireless network, an acknowledgement of the VNF instantiation; and sending, from the VNFM via the NFVO to an NFV NM configured to provide network management for a virtualized portion of the mixed wireless network, an acknowledgement of the VNF instantiation.

8. The method of claim 7, wherein the successful allocation of the virtualized resources for the VNF is performed using a virtualized infrastructure manager (VIM) along with the NFVO.

9. The method of claim 7, wherein the first request to instantiate the VNF received from the NM is validated at the NFVO.

10. The method of claim 7, further comprising configuring, at the VNFM, one or more deployment parameters for the VNF.

11. The method of claim 7, wherein the VNF is configured with application specific parameters by the EM.

12. The method of claim 7, further comprising sending, to the NFVO, the acknowledgement of the VNF instantiation.

13. A non-transitory computer-readable storage medium including instructions for a virtualized network function manager (VNFM) in a mixed wireless network operable to facilitate instantiation of a virtualized network function (VNF) that when executed by a processor, cause the processor to:

process, at the VNFM, a first request to instantiate a VNF from a network manager (NM) configured to provide network management for a non-virtualized portion of the mixed wireless network via a network function virtualization (NFV) orchestrator (NFVO), the first request including VNF instantiation information;

generate, for sending from the VNFM to the NFVO, a second request for allocating virtual resources for the VNF based on the VNF instantiation information;

process, at the VNFM, an acknowledgement from the NFVO after successful allocation of the virtualized resources for the VNF;

instantiate, at the VNFM, the VNF;

generate, for sending from the VNFM to an NFV element manager (EM), an acknowledgement of the VNF instantiation;

generate, for sending from the VNFM via the NFVO to the NM configured to provide network management for a non-virtualized portion of the mixed wireless network, an acknowledgement of the VNF instantiation; and generate, for sending from the VNFM via the NFVO to an NFV NM configured to provide network management for a virtualized portion of the mixed wireless network, an acknowledgement of the VNF instantiation.

14. The non-transitory computer-readable storage medium of claim 13, wherein the successful allocation of the virtualized resources for the VNF is performed using a virtualized infrastructure manager (VIM) along with the NFVO.

15. The non-transitory computer-readable storage medium of claim 13, wherein the first request to instantiate the VNF received from the NM is validated at the NFVO.

16. The non-transitory computer-readable storage medium of claim 13, wherein the instructions further cause the processor to: configure, at the VNFM, one or more deployment parameters for the VNF.

17. The non-transitory computer-readable storage medium of claim 13, wherein the VNF is configured with application specific parameters by the EM.

18. The non-transitory computer-readable storage medium of claim 13, wherein the instructions further cause the processor to: to generate, for sending to the NFVO, the acknowledgement of the VNF instantiation.

* * * * *